(12) United States Patent
Durand et al.

(10) Patent No.: US 9,813,348 B2
(45) Date of Patent: *Nov. 7, 2017

(54) SYSTEM FOR TRANSMITTING CONCURRENT DATA FLOWS ON A NETWORK

(71) Applicant: KALRAY, Orsay (FR)

(72) Inventors: Yves Durand, Saint Ismier (FR); Alexandre Blampey, Sassenage (FR)

(73) Assignee: KALRAY, Orsay (FR)

( * ) Notice: Subject to any disclaimer, the term of this patent is extended or adjusted under 35 U.S.C. 154(b) by 227 days.

This patent is subject to a terminal disclaimer.

(21) Appl. No.: 14/367,050

(22) PCT Filed: Dec. 19, 2012

(86) PCT No.: PCT/FR2012/000536
§ 371 (c)(1),
(2) Date: Jun. 19, 2014

(87) PCT Pub. No.: WO2013/093241
PCT Pub. Date: Jun. 27, 2013

(65) Prior Publication Data
US 2014/0301207 A1    Oct. 9, 2014

(30) Foreign Application Priority Data
Dec. 19, 2011 (FR) ...................... 11 61872

(51) Int. Cl.
*H04L 12/835* (2013.01)
*H04L 12/54* (2013.01)
(Continued)

(52) U.S. Cl.
CPC .......... *H04L 47/30* (2013.01); *H04L 12/5601* (2013.01); *H04L 47/6255* (2013.01);
(Continued)

(58) Field of Classification Search
None
See application file for complete search history.

(56) References Cited

U.S. PATENT DOCUMENTS 5,737,313 A * 4/1998 Kolarov .............. H04L 49/3081
370/234
6,144,637 A * 11/2000 Calvignac .......... H04Q 11/0478
370/229

(Continued)

OTHER PUBLICATIONS

Dynamic queue length thresholds for shared memory packet switches Choudhury et al. Apr. 1998 IEEE ACM transactions on networking, vol. 6 #2.*

(Continued)

*Primary Examiner* — Rina Pancholi
(74) *Attorney, Agent, or Firm* — Oliff PLC

(57) ABSTRACT

A system for transmitting concurrent data flows on a network, includes a memory containing data of data flows; a plurality of queues assigned respectively to the data flows, organized to receive the data as atomic transmission units; a flow regulator to poll the queues in sequence and, if the polled queue contains a full transmission unit, transmitting the unit on the network at a nominal flow-rate of the network; a sequencer to poll the queues in a round-robin manner and enable a data request signal when the filling level of the polled queue is below a threshold common to all queues, which threshold is greater than the size of the largest transmission unit; and a direct memory access configured to receive the data request signal and respond thereto by transferring data from the memory to the corresponding queue at a nominal speed of the system, up to the common threshold.

5 Claims, 3 Drawing Sheets

(51) Int. Cl.
*H04L 12/863* (2013.01)
*H04L 12/861* (2013.01)
*H04L 12/70* (2013.01)

(52) U.S. Cl.
CPC ........ *H04L 49/9036* (2013.01); *H04L 47/628* (2013.01); *H04L 2012/5679* (2013.01)

(56) References Cited

U.S. PATENT DOCUMENTS

| | | | |
|---|---|---|---|
| 6,424,622 B1* | 7/2002 | Fan | H04L 49/3081 370/230 |
| 6,704,321 B1 | 3/2004 | Kamiya | |
| 8,588,242 B1* | 11/2013 | Izenberg | H04L 47/527 370/235 |
| 2005/0249497 A1* | 11/2005 | Haran | H04L 47/13 398/58 |
| 2006/0067225 A1* | 3/2006 | Fedorkow | H04L 12/5601 370/235 |
| 2008/0159140 A1* | 7/2008 | Robinson | H04L 12/2801 370/232 |
| 2008/0211538 A1* | 9/2008 | Lajolo | H03K 19/17736 326/38 |

OTHER PUBLICATIONS

International Preliminary Report on Patentability issued in PCT/FR2012/000536 issued Jun. 24, 2014 (with translation).
International Search Report issued in PCT/FR2012/000536 on Mar. 7, 2013 (with translation).

\* cited by examiner

Fig 6
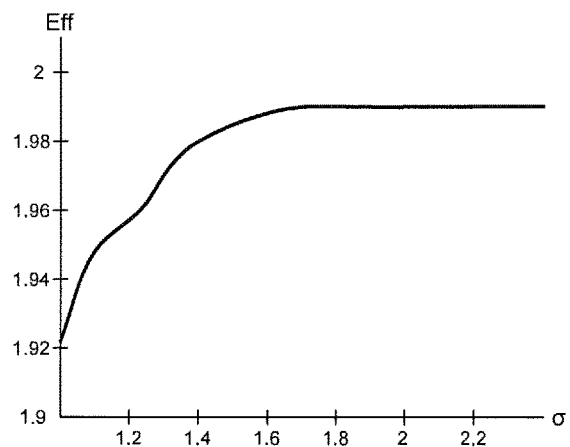
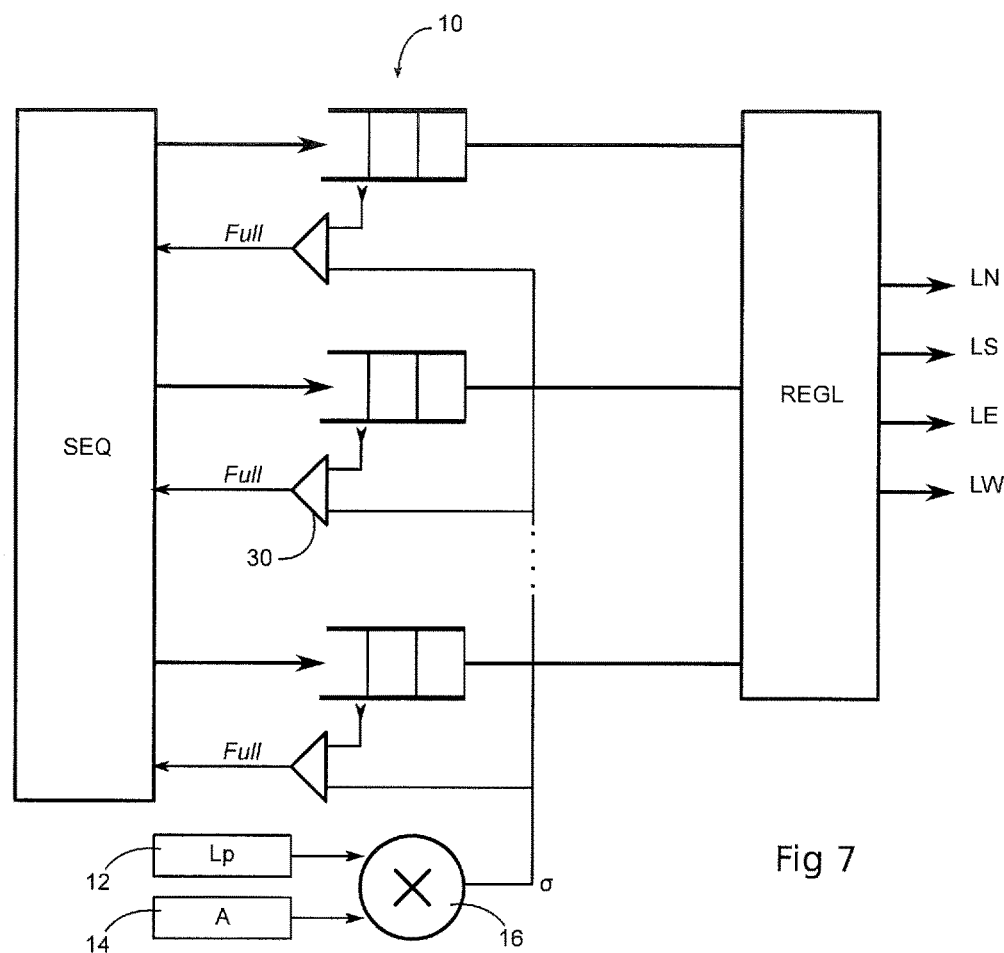
Fig 7

SYSTEM FOR TRANSMITTING CONCURRENT DATA FLOWS ON A NETWORK

FIELD

The invention relates to networks-on-chip, and more particularly to a scheduling system responsible for transmitting data flows in the network at the router level.

BACKGROUND

There are many traffic scheduling algorithms that attempt to enhance the bandwidth utilization and the quality of service on a network. In the context of communication networks, the works initiated by Cruz ["A Calculus for Network Delay", Part I: Network Elements in Isolation and part II: Network Analysis, R L Cruz, IEEE Transactions on Information Theory, vol. 37, No. 1 January 1991] and by Stiliadis ["Latency-Rate Servers: A General Model for Analysis of Traffic Scheduling Algorithms", Dimitrios Stiliadis et al, IEEE/ACM TRANSACTIONS ON NETWORKING, VOL. 6, NO. 5 OCTOBER 1998] have built a theory that relates the notions of service rate, worst-case latency of a shared communication channel, and utilization rate of storage resources on the network elements.

This theory served as a basis for different traffic management systems. The most common method used at the router level is the weighted fair queuing method described in "Computer Networks (4th Edition)" by Andrew Tannenbaum, page 441 of the French version. An alternative better suited for networks-on-chip is to inject the traffic using the leaky bucket mechanism, described in "Computer Networks (4th Edition)" by Andrew Tannenbaum, from page 434 of the French version.

In every case, this amounts to assigning an average flow $\rho_i$ to a "session" $S_i$ on a network link.

A buffer or queue is allocated to each data transmission session $S_i$ (i=1, 2, ... n), for instance a channel, a connection, or a flow. The contents of these queues are transferred sequentially on a network link L at the nominal link speed r.

A flow regulator operates on each queue in order to limit the average rate of the corresponding session $S_i$ to a value $\rho_i \leq r$. The rates $\rho i$ are usually chosen so that their sum is less than or equal to r.

To understand the operation globally, it may be imagined that the contents of the queues are emptied in parallel into the network at respective rates pi. In reality, the queues are polled sequentially, and the flow regulation is performed by polling less frequently the queues associated with lower bit rates, seeking an averaging effect over several polling cycles.

Under these conditions, Stiliadis et al. demonstrate that the latency between the time of reading a first word of a packet in a queue and sending the last word of the packet on the link L is bounded for certain types of scheduling algorithms. In the case of weighted fair queuing (WFQ), this latency is bounded by $Sp_i/\rho_i + Sp_{max}/r$, where $Sp_i$ is the maximum packet size of session i, and $Sp_{max}$ the maximum packet size among the ongoing sessions.

This latency component is independent of the size of the queues. Now it is known that in systems using multiple queues for channeling multiple flows on a shared link, the size of the queues introduces another latency component between the writing of data in a queue and the reading of the same data for transmission on the network.

SUMMARY

There is a need for a transmission system of several data flows that reduces the total latency between the arrival of data in a queue and the sending of the same data over the network.

This need may be addressed by a system for transmitting concurrent data flows on a network, comprising a memory containing the data of the data flows; a plurality of queues assigned respectively to the data flows, organized to receive the data as atomic transmission units; a flow regulator configured to poll the queues in sequence and, if the polled queue contains a full transmission unit, transmitting the unit on the network at a nominal flow-rate of the network; a sequencer configured to poll the queues in a round-robin manner and enable a data request signal when the filling level of the polled queue is below a threshold common to all queues, which threshold is greater than the size of the largest transmission unit; and a direct memory access circuit configured to receive the data request signal and respond thereto by transferring data from the memory to the corresponding queue at a nominal speed of the system, up to the common threshold.

This need may also be addressed by a system for transmitting concurrent data flows on a network, comprising a memory containing the data of the data flows; a plurality of queues assigned respectively to the data flows, organized to receive the data as atomic transmission units; a flow regulator configured to poll the queues in sequence and, if the polled queue contains a full transmission unit, transmitting the unit on the network at a nominal flow-rate of the network; a queue management circuit configured to individually fill each queue from the data contained in the memory, at a nominal speed of the system, up to a threshold common to all queues; a configuration circuit configurable to provide the common threshold of the queues; and a processor programmed to produce the data flows and manage their assignment to the queues, and connected to the configuration circuit to dynamically adjust the threshold according to the largest transmission unit used in the flows being transmitted.

The common threshold may be smaller than twice the size of the largest transmission unit.

The system may comprise a network interface including the queues, the flow regulator, and the sequencer; a processor programmed to produce the data flows, manage the allocation of the queues to the flows, and determine the average rates of the flows; a system bus interconnecting the processor, the memory and the direct memory access circuit; and a circuit for calculating the common threshold based on the contents of two registers programmable by the processor, one containing the size of the largest transmission unit, and the other containing a multiplication factor between 1 and 2.

The flow regulator may be configured to adjust the average rate of a flow by bounding the number of transmission units transmitted over the network in a consecutive time window.

BRIEF DESCRIPTION OF DRAWINGS

Other advantages and features will become more clearly apparent from the following description of particular embodiments of the invention provided for exemplary purposes only and represented in the appended drawings, in which:

FIG. 6 is a graph illustrating the efficiency of the average bandwidth utilization of the system as a function of the actual size of the queues; and FIG. 7 shows an embodiment of a transmission system including a dynamic adjustment of a full queue threshold.

DESCRIPTION OF EMBODIMENTS

Figure 1:
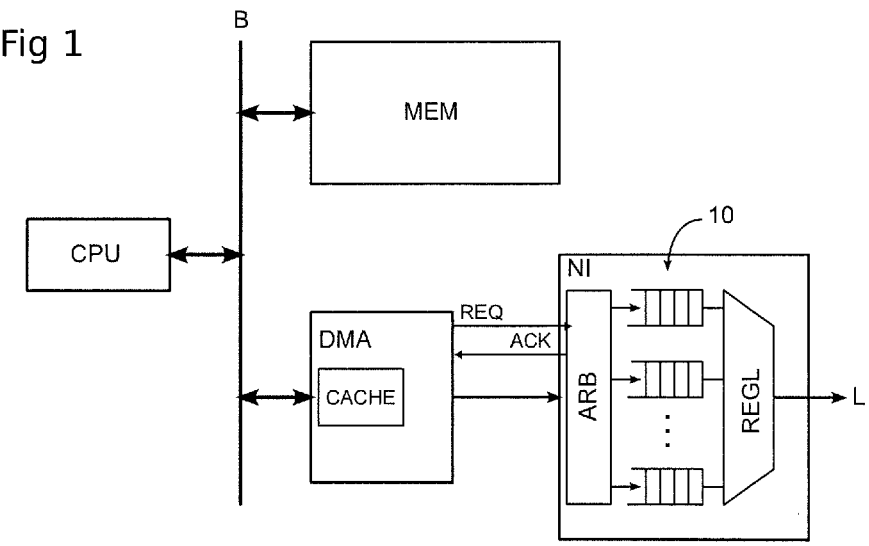
FIG. 1 schematically shows a system for transmitting several concurrent flows on a shared network link, as it could be achieved in a conventional manner by applying the teachings mentioned above.

FIG. 1 schematically shows an example of a system for transmitting several concurrent flows on a shared network link L, such as could be achieved by applying in a straightforward way the teachings of Cruz, Stiliadis and Tannenbaum, mentioned in the introduction.

The system includes a processor CPU, a memory MEM, and a direct memory access circuit DMA, interconnected by a system bus B. A network interface NI is connected to send through the network link L data provided by the DMA circuit. This network interface includes several queues 10 arranged, for example, to implement weighted fair queuing (WFQ). The filling of the queues is managed by an arbitration circuit ARB, while the emptying of the queues in the network link L is managed by a flow regulation circuit REGL.

The DMA circuit is configured to transmit a request signal REQ to the network interface NI when data is ready to be issued. The DMA circuit is preferably provided with a cache memory for storing data during transmission, so that the system bus is released. The arbitration circuit of the network interface is designed to handle the request signal and return an acknowledge signal ACK to the DMA circuit.

While data transfers from memory to the DMA circuit and to the queues 10 may be achieved by words of the width of the system bus, in bursts of any size, transfers from the queues 10 to the network link L should be compatible with the type of network. From the point of view of the network, the data in the queues are organized in "transmission units", such as "cells" in ATM networks, "packets" in IP networks and often in networks-on-chip, or "frames" in Ethernet networks. Since the present disclosure is written in the context of a network-on-chip, the term "packets" will be used, bearing in mind that the described principles may apply more generally to transmission units.

A packet is usually "atomic", i.e. the words forming the packet are conveyed contiguously on the network link L, without mixing them with words belonging to concurrent flows. It is only when a complete packet has been transmitted on the link that a new packet can be transmitted. In addition, it is only when a queue contains a complete packet that the flow regulator REGL may decide to transmit it.

Figure 2:
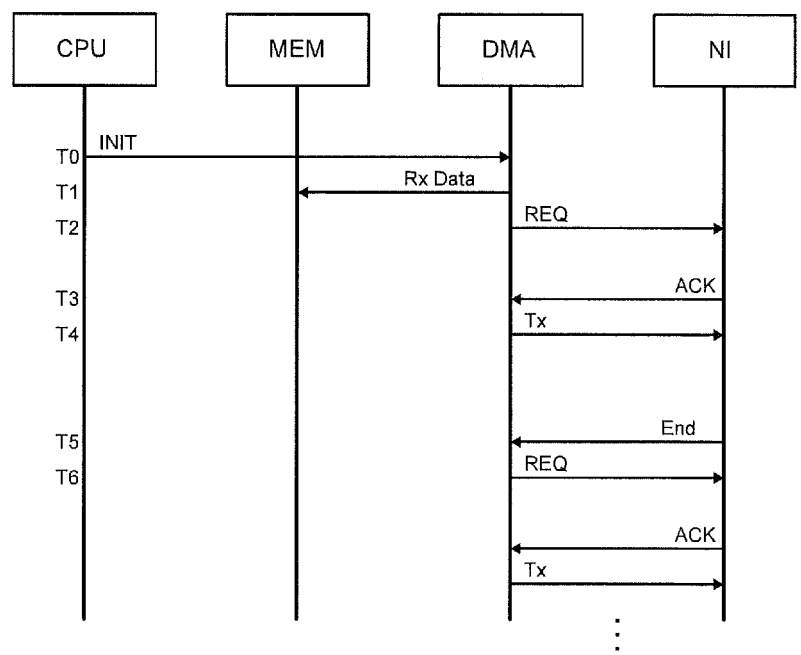
FIG. 2 is a graph illustrating the operation of the system of FIG. 1.

FIG. 2 is a graph illustrating in more detail phases of a transmission of a batch of data in the system of FIG. 1. It shows on vertical time lines interactions between the system components. A "data batch" designates a separable portion of a data flow that is normally continuous. A data flow may correspond to the transmission of video, while a batch corresponds, for instance, to a picture frame or a picture line.

At T0 the processor CPU, after producing a data batch in a location of the memory MEM, initializes the DMA circuit with the source address of the batch and the destination address, to which is associated one of the queues 10 of the network interface.

At T1, the DMA circuit transfers the data batch from the memory MEM to its internal cache, and releases the system bus.

At T2, the DMA circuit sends an access request REQ to the network interface NI. This request identifies the queue 10 in which the data should be written.

At T3, the network interface acknowledges the request with an ACK signal, meaning that the selected queue 10 has available space to receive data.

At T4, the DMA circuit responds to the acknowledge signal by the transmission of data from its cache to the network interface NI, where they are written in the corresponding queue 10.

At T5, the network interface detects the full state of the queue and signals an end of transfer to the DMA circuit.

At T6, the DMA circuit still having data to transmit, issues a new request for a transfer, and the cycle repeats.

The emptying of the queues 10 in the network is performed uncorrelated with the arbitration of the requests, according to a flow regulation mechanism that may handle a queue only when it contains a full packet.

This transfer protocol is satisfactory when data producers request the network from time to time, in other words when a producer does not occupy the bandwidth of the network link in a sustained manner. This is the case for communication networks.

In a network-on-chip, it is sought to fully occupy the bandwidth of the network links, and producers are therefore designed to sustainably saturate their network links.

As stated above, a producer may issue several concurrent flows on its network link. This would be reflected in FIG. 2 by the transfer of several corresponding batches of data in the cache of the DMA circuit and by the presentation of multiple concurrent requests to the network interface NI. A single request at a time is acknowledged as a result of an arbitration that also takes into account the space available in the queues 10.

In the case of a sustained filling phase of the queues 10 occurring in response to many outstanding requests, the arbitration delays may take a significant proportion of the available bandwidth.

In this context, it is possible that the destination queue remains empty for a period of time and thus "passes its turn" for network access opportunities, which has the effect of reducing the bandwidth actually used. According to theories ruling queues, the probability that the queue becomes empty decreases when the queue size increases, which is why this queue is often chosen oversized. Another solution to reduce this probability is by increasing the frequency of the requests issued by the producer process. Both solutions impact the efficiency in the context of a network-on-chip, which is why an alternative system for accessing the network is proposed herein.

Figure 3:
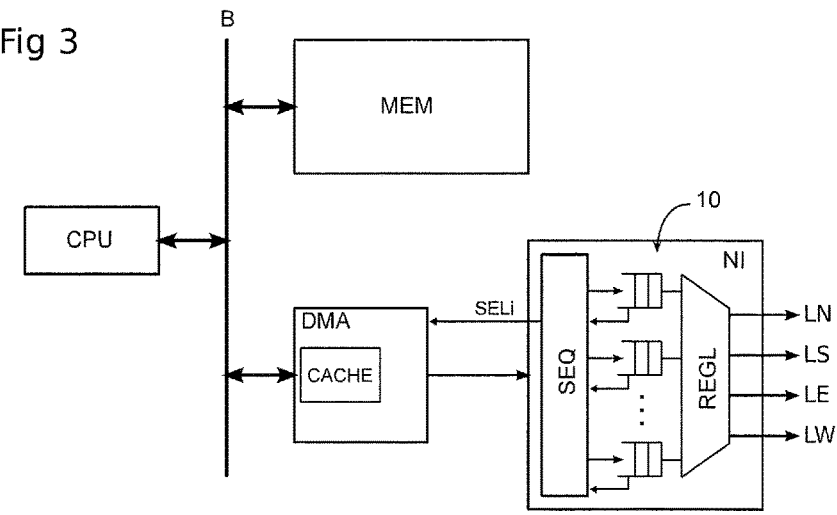
FIG. 3 schematically shows an optimized embodiment of a system for transmitting multiple concurrent flows on one or more shared network links.

FIG. 3 schematically shows an embodiment of such a system. This embodiment is described in the context of a network-on-chip having a folded torus array topology, as described in US patent application 2011-0026400. Each node of the network includes a five-way bidirectional router comprising a local channel assigned to the DMA circuit and four channels (north LN, south LS, east LE, and west LW) respectively connected to four adjacent routers of the array.

The local channel is assumed to be the entry point of the network. Packets entering through this local channel may be switched, according to their destination in the network, to any of the other four channels, which will be considered as independent network links. Thus, instead of being transmitted in the network by a single link L, as shown in FIG. 1, packets may be transmitted by any one of the four links LN, LS, LE, and LW. This multitude of network links does not affect the principles described herein, which may apply to a single link. A flow is in principle associated with a single network link, which may be considered as the single link of FIG. 1. There is a difference in the overall network bandwidth when multiple concurrent flows are assigned to different links: these flows may be transmitted in parallel by the flow regulator, so that the overall bandwidth is temporarily a multiple of the bandwidth of an isolated link.

The system of FIG. 3 differs from that of FIG. 1 essentially by the communication protocol implemented between the DMA circuit and the network interface NI. The DMA circuit no longer sends requests to the network interface to transmit data, but waits for the network interface NI to request data by enabling a selection signal SELi identifying the queue 10 to serve. The signal SELi is generated by a sequencer SEQ replacing the request arbitration circuit of FIG. 1.

The sequencer SEQ may be simply designed to perform a round-robin poll of the queues 10 and enable the selection signal SELi when the polled queue has space for data. In such an event, the sequencer stops, waits for the queue to be filled by the DMA circuit, disables the signal SELi, and moves to the next queue.

Figure 4:
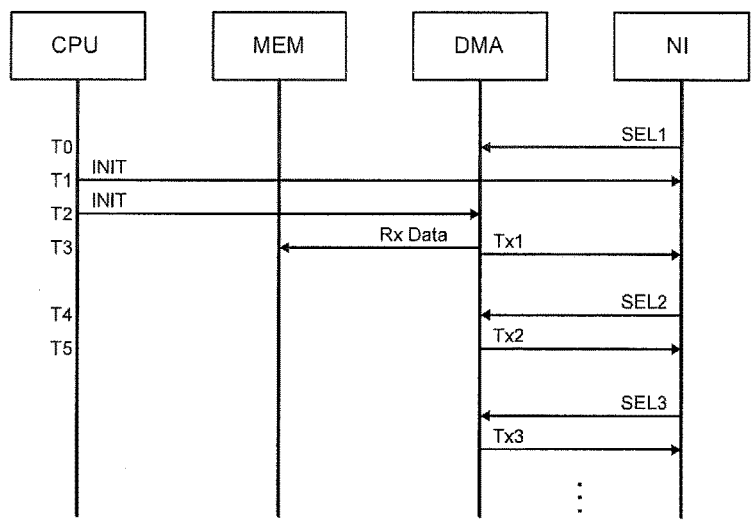
FIG. 4 is a graph illustrating the operation of the system of FIG. 3.

FIG. 4 illustrates this operation in more detail.

At T0, the system is idle and all queues 10 are empty. The sequencer SEQ enables selection signal SEL1 of the first queue and waits for data.

At T1, the processor CPU has produced several batches of data in the memory MEM. The processor initializes the network interface NI to allocate respective queues 10 to the batches, for example by writing the information in registers of sequencer SEQ.

At T2, the processor initializes the DMA circuit for transferring the multiple batches in the corresponding queues.

At T3, the DMA circuit reads the data batches into its cache. As soon as signal SEL1 is active, the DMA circuit may start transferring data from the first batch (Tx1) to the network interface NI, where they are written in the first queue 10.

At T4, the first queue is full. The sequencer disables signal SEL1 and enables signal SEL2 identifying the second queue to fill.

At T5, the DMA circuit transfers data from the second batch (Tx2) to the network interface, where it is written in the second queue 10, until the signal SEL2 is disabled and a new signal SEL3 is enabled to transfer the next batch.

With this system, distinct flow transfers are processed sequentially, without requiring an arbitration to decide which flow to process. The bandwidth between the DMA circuit and the queues may be used at 100%.

It is desirable to reduce the latency introduced by the queues 10. For this purpose, the queue size should be reduced. The minimum size is the size Sp of a packet, since the flow regulator processes a queue only if it contains a full packet. A question is whether this queue size is satisfactory or what queue size could be better.

Figure 5:
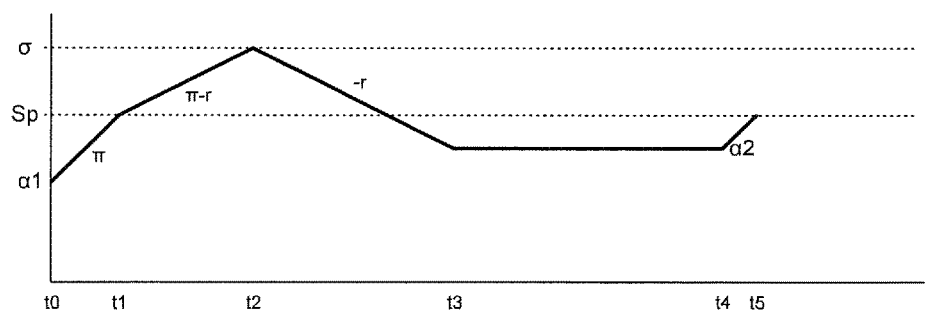
FIG. 5 is a graph illustrating filling level variations of a queue of the system of FIG. 3.

FIG. 5 is a graph depicting an exemplary fill variation of a queue 10 in operation. As an example, the filling rate $\pi$ is chosen equal to twice the nominal transmission rate r of the network. The rate $\pi$ may be the nominal transmission rate of the DMA circuit, which is generally greater than the nominal transmission rate of a network link. The packet size is denoted Sp and the queue size is denoted $\sigma$.

At a time t0, the sequencer SEQ selects the queue for filling. The residual filling level of the queue is $\alpha 1 < Sp$. The queue fills at rate $\pi$.

At a time t1, the filling level of the queue reaches Sp. The queue contains a full packet, and the emptying of the queue in the network can begin. If the flow regulator REGL actually selects the queue at t1, the queue is emptied at rate r. The queue continues to fill but slower, at an apparent rate $\pi - r$.

At a time t2, the filling level of the queue reaches its limit $\sigma$. The filling stops, but the emptying continues. The queue is emptied at the rate r. The sequencer SEQ selects the next queue to fill.

At a time t3, a full packet has been transmitted to the network. The queue reaches a residual filling level $\alpha 2 < Sp$, whereby a new full packet cannot be issued. The flow regulator proceeds with the next queue.

At a time t4, the queue is selected for filling again, and the cycle repeats as at time t0, from a new residual filling level of $\alpha 2$. The queue contains a new full packet at a time t5.

This graph does not show the influence of rate limits $\rho$ applied to the flows. The graph shows an emptying of the queues at the nominal rate r of the network link. In fact, flow-rate limiting may be performed by an averaging effect: the queues are always emptied at the maximum available speed, but it is the frequency of polling (that does not appear on the graph) that is adjusted by the flow regulator for obtaining the average flow-rate values. For example, with three queues A, B and C having flow-rates 0.5, 0.25 and 0.25, the following poll sequence could be used: A, B, A, C, A, B, A, C . . .

Preferably, a flow-rate regulation as described in US patent application 2011-0026400 is used. This regulation is based on quotas of packets that the flows can transmit over the network in a sliding time window. With such a flow regulation, all the queues are polled at the beginning of a window, whereby each queue transmits the packets it has, even if it is associated to a lower flow-rate value. However, once a queue has delivered its quota of packets in the window, its polling is suspended until the beginning of the next window. Thus, the number of packets that a flow can transmit on the network is bounded in each window, but packets may be transmitted at any time in the window.

As stated above, the emptying of the queue may only begin when the queue contains a full packet. In FIG. 5, this occurs at times t1 and t5. Note that there is a quiescent phase at the beginning of each cycle where the queue cannot be emptied. Since the flow regulator operates independently of the sequencer, there is a probability that the controller polls a queue during such a quiescent phase. The flow regulator then skips the queue and moves to the next, reducing the efficiency of the system.

Intuitively, it may be observed that the quiescent phases decrease when increasing the queue size $\sigma$, and that they may disappear for $\sigma = 2$ Sp.

FIG. 6 is a graph illustrating the utilization efficiency of the system bandwidth based on the queue size $\sigma$. This graph is the result of simulations achieved on four queues with $\pi = 2$ r. The rates ρ of the corresponding flows were selected at values 0.2, 0.3, 0.7 and 0.8 (summing up to a theoretical maximum of 2, carried on the ordinate axis of the graph).

Note that the efficiency starts at a reasonable value of 1.92 for σ=1, and tends asymptotically to 2. The efficiency almost reaches 1.99 for σ=1.6. In other words, an efficiency of 96% is obtained with σ=1, and an efficiency of 99.5% is obtained with σ=1.6.

Thus the system is particularly efficient with a queue size between 1 and 2 packets, which is a particularly low value for significantly reducing the latency.

It turns out that the packet size may vary from one flow to the other, depending on the nature of the data transmitted. In this case, for the system to be adapted to all situations, the queue size should be selected based on the maximum size of the packets to process, which would impair the system when the majority of the processed flows have a smaller packet size.

This compromise may be mitigated by making the queue size dynamically adjustable, as a function of the flows being processed simultaneously. In practice, a queue in a network interface is a hardware component whose size is not variable. Thus, a physical queue size may be chosen according to the maximum packet size of the flows that may be processed by the system, but the queues are assigned an adjustable fill threshold σ. It is the filling level with respect to this threshold that the sequencer SEQ checks for enabling the corresponding selection signal SELi (FIG. 3).

FIG. 7 shows an exemplary embodiment of a network interface, integrating queues 10 having an adjustable fill threshold. The packet size Sp and a multiplication factor K (e.g. 1.6) are written in respective registers 12, 14 of the network interface. The writing may occur at time T1 of graph 4, when the processor CPU configures the network interface to assign the queues to the flows to be transferred. If the flows to be transferred have different packet sizes, the value Sp to write in the register 12 is the largest.

The contents of registers 12 and 14 are multiplied at 16 to produce the threshold σ. This threshold is used by comparators 30 associated respectively to the queues 10. Each comparator 30 enables a Full signal for the sequencer SEQ when the filling level of the corresponding queue 10 reaches the value σ. When a Full signal is enabled, the sequencer selects the next queue to fill.

Although it is preferred to use the adjustable threshold in the system of FIG. 3, the benefits of this approach are independent of the system. Thus, the approach may be used in the system of FIG. 1 or any other system.

What is claimed is:

1. A system for transmitting concurrent data flows on a network, the data flows being conveyed over the network in atomic transmission units of multiple data words, the system comprising:
   a memory containing data of the data flows;
   a plurality of queues assigned respectively to the data flows, the plurality of queues being connected to the memory to receive the data words;
   a flow regulator configured to: (i) poll the queues in sequence at respective frequencies based on respective rate limits assigned to the queues, and (ii) transmit on the network any full transmission unit available in the queues polled by the flow regulator;
   a sequencer configured to poll the queues in a round-robin manner and transmit a data request signal when a filling level of one of the queues polled by the sequencer is below a common threshold for all the queues; and
   a direct memory access circuit configured to receive the data request signal and respond to the data request signal by transferring data words from the memory to the corresponding queue to fill space up to the common threshold, even if the available space is insufficient for a transmission unit.

2. The system of claim 1, wherein the common threshold is smaller than twice the size of the largest transmission unit.

3. The system of claim 2, wherein the common threshold is dynamically adjustable to take into account transmission unit sizes actually used by the data flows being transmitted.

4. The system of claim 2, further comprising:
   a network interface including the queues, the flow regulator, and the sequencer;
   a processor programmed to produce the data flows, manage allocation of the queues to the data flows, and determine average rates of the flows;
   a system bus interconnecting the processor, the memory and the direct memory access circuit; and
   a circuit for calculating the common threshold based on contents of two registers programmable by the processor, one register of the two registers containing the size of the largest transmission unit, and other register of the two registers containing a multiplication factor between 1 and 2.

5. The system of claim 1, wherein the flow regulator is configured to adjust an average rate of a flow by bounding a number of transmission units transmitted over the network in a consecutive time window.

* * * * *